Figure 1:
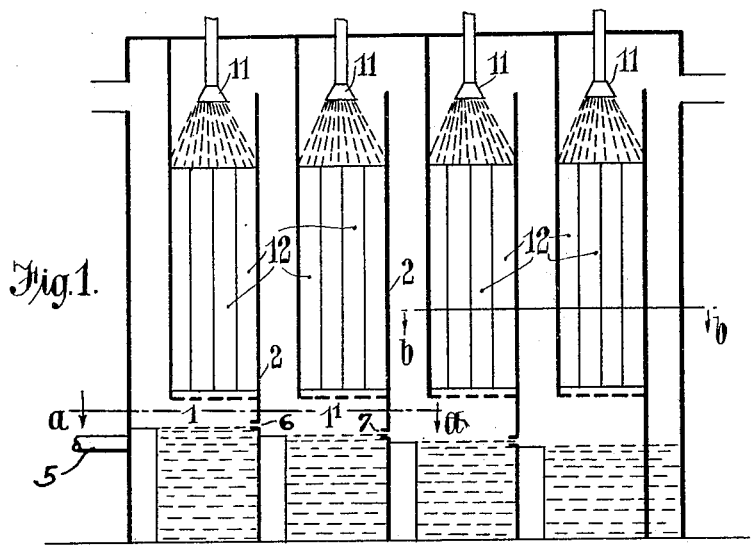

July 19, 1932. T. O. WILTON 1,867,933
APPARATUS FOR TREATING GASES WITH LIQUIDS
Filed Oct. 16, 1929 2 Sheets-Sheet 1

Inventor
THOMAS OWSTON WILTON,
BY Toulmin & Toulmin
Attorneys

July 19, 1932. T. O. WILTON 1,867,933
APPARATUS FOR TREATING GASES WITH LIQUIDS
Filed Oct. 16, 1929 2 Sheets-Sheet 2

Inventor
THOMAS OWSTON WILTON,
BY
Toulmin & Toulmin
Attorneys.

Patented July 19, 1932

1,867,933

UNITED STATES PATENT OFFICE

THOMAS OWSTON WILTON, OF LONDON, ENGLAND, ASSIGNOR TO THE CHEMICAL ENGINEERING AND WILTON'S PATENT FURNACE COMPANY LIMITED, OF LONDON, ENGLAND

APPARATUS FOR TREATING GASES WITH LIQUIDS

Application filed October 16, 1929. Serial No. 399,927.

This invention relates to apparatus for treating gases with liquids, of the type in which the gas is introduced at the top of a series of chambers and is brought into contact with the sprayed liquid, the gas and the liquid travelling then downwards together against fixed contact surfaces, the water collecting at the bottom of each chamber and being circulated in each chamber so as to be repeatedly brought in contact with fresh gas before passing into the next chamber, the gas then passing on to the top of the said next chamber, and so on.

The invention has for its object to provide an apparatus of this known type in which the highest possible efficiency is obtained by securing the most effective action of the fluids in presence by ensuring that the least used liquid shall be repeatedly brought in contact with the gas.

In apparatus hitherto constructed, this object has been sought by arranging that the liquid collecting at the bottom of each chamber is sprayed again in the same chamber so as to be brought repeatedly in contact with a fresh quantity of gas, the gas passing on from one chamber to the next and, as it does so, being brought in contact with fresher liquid in each successive chamber.

In the apparatus hitherto constructed for treating gases with liquids, the liquid collecting at the bottom of the chambers overflows from one chamber to the next against the general flow of the gas from chamber to chamber, in such a way that the freshest (incoming) liquid meets the (outgoing) gas which has been repeatedly treated, the (outgoing) liquid which is most used meeting the fresh (incoming) gas which has not yet been treated. The passages from a chamber to the next are in line with one another. It has been found that with this arrangement there is a tendency for the liquid from a chamber to pass mostly straight through the following chamber without mixing with the liquid already in that chamber, thereby failing to secure the observance of the principle just outlined, for the latter liquid has already been brought in contact with fresher gas than the gas with which the incoming liquid has been in contact, and is therefore more spent, while the incoming liquid is not spent to the same extent and has therefore a higher treatment effect. It is an object of the apparatus according to the present invention to secure this higher treatment effect.

The packing used in the apparatus hitherto in use consists of separate or loose packing elements supported on a perforated false bottom such as a perforated tray or grate. The object of this invention is to provide an improved packing, more efficient and more convenient to handle as a whole.

With the above objects in view, the invention includes the following novel features and details of construction, to be hereinafter more fully described, illustrated in the accompanying drawings and pointed out in the appended claims;

(1) Means for causing the liquid to leave each chamber at the corner diagonally opposite to that at which it enters the chamber, by suitably disposing the inlet and outlet so that they are not in alignment, as has been done hitherto.

(2) Means for ensuring that the fresh liquid entering a chamber will be circulated in preference to the less fresh liquid already in the chamber.

Figure 2:
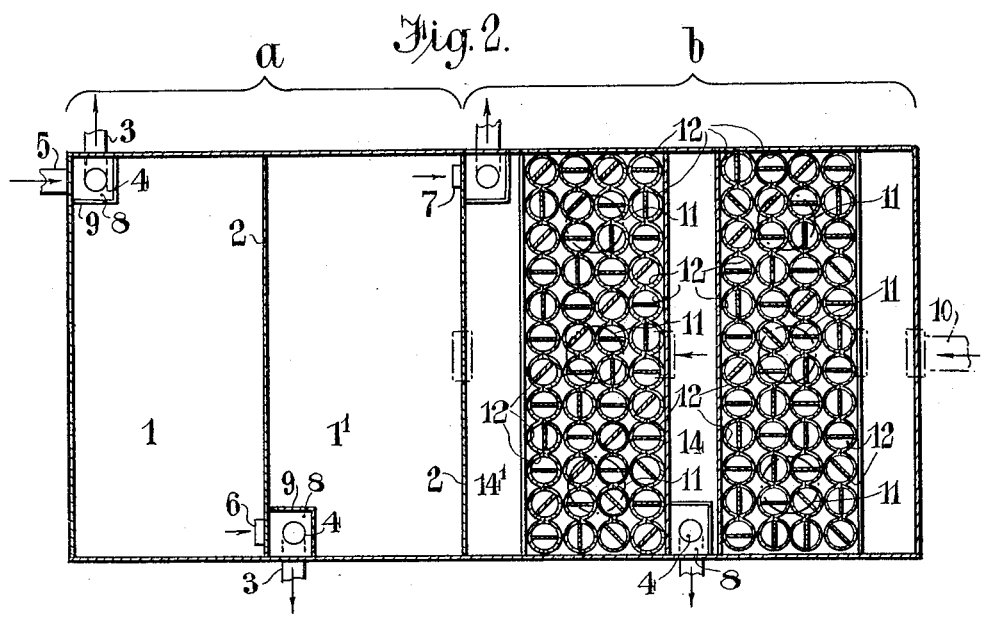

In the drawings, Fig. 1 represents diagrammatically in sectional elevation, as an example, a four-chamber apparatus for treating gases with liquid according to the invention. Fig. 2 represents the apparatus in horizontal section, the left hand half (portion $a$) being a section through the space at the bottom of the chamber, that is, along $a\ a$ of Fig. 1, and the right hand half (portion $b$) being through the packing, that is, along $b\ b$ of Fig. 1.

Figure 3:
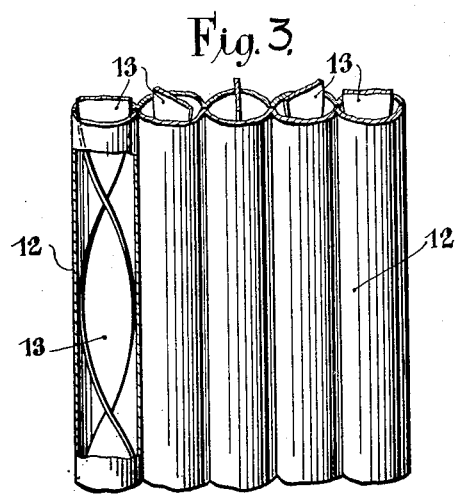

Fig. 3 shows the packing on a larger scale.

In the apparatus according to this invention, the passages leading the liquid from one chamber to the next are staggered so as to cause the liquid entering any one chamber to set up a movement of circulation of the liquid already in the chamber thereby securing a thorough mixing of this liquid with the incoming liquid, the liquid entering at a corner diagonally opposite to that at which the liquid leaves the chamber, as shown in Figure 2.

Since the liquid which has been least acted upon has the most efficient action, it is advisable to cause the liquid flowing into any chamber to be brought in contact with the gas admitted into that chamber for treatment, in preference to the liquid already collected at the bottom of the chamber. In order to obtain this result, the intake of the liquid lifting device causing the circulation in each chamber is placed in the vicinity of the inlet through which the liquid flows into that chamber from the chamber before, and these two openings, intake and inlet, are so arranged that they both open in a compartment partitioned out of the remainder of the space at the bottom of the chamber, preferably by means of a submerged partition which allows the liquid to overflow into this compartment. The horizontal cross section of the said compartment being from 1–1½ times the area of the intake to the lifting device, the latter will always be provided with a sufficiency of liquid, but, as the inflowing liquid from the tank before opens in the vicinity of the said intake, the latter liquid will be preferably pumped and lifted up for sprinkling in the upper portion of the chamber.

The packing proposed in the most efficient apparatus of the kind referred to consists of loose elements resting on a perforated false bottom such as a grate or sieve. According to the present invention the packing is an integral block consisting of corrugated metal sheets secured together in any suitable manner, such as, for instance, spot welding, in such a manner as to constitute a series of vertical tubular passages in each of which is inserted a metal strip twisted about its longitudinal axis, so as to impart to the mixed gas and liquid travelling down the tubular passage a gyratory motion which throws them against the walls of the tubular passages, thereby securing a larger area of contact for the two fluids to be brought into intimate contact. Ordinary corrugated sheets are not suitable for this purpose as the spaces formed between two juxtaposed corrugations are not circular so that the mixed gas and liquid trickle down into the corners without being acted upon by the twisted strip and the packing is therefore less effective. Sheets, the corrugations of which are cusped to each other, on the other hand, when secured together with the cusps juxtaposed, give passages which are circular in cross section. The sheets may be spot-welded at the cusps or at the middle of the rounded ridges formed by the corrugations. They may be secured together in pairs only, and assembled as required, being held together by strips surrounding the whole, or the whole set of sheets constituting the packing of one chamber can be secured together as described.

Referring to the drawings in detail, the left hand portion of the figure (portion $a$) is a horizontal section through the lower portion of the chambers, above the level of the liquid, but below the false bottom or grate; the right hand portion (portion $b$) is a horizontal section through the portion of the chambers occupied by the packing. The bottom space 1, 1' of each chamber is occupied by the liquid which has been sprinkled on the top of the packing and has percolated down with the gas; this liquid is continually circulated through the chamber, being pumped out by lifting devices the intake pipes 3 of which open at 4 and lead back again to the sprinklers at the top of the chamber. The fresh, unused liquid enters the first chamber 1 of the apparatus at 5, and leaves it by an overflow passage 6 to enter the second chamber 1' where it is similarly circulated, and from which it passes on into the next chamber at 7 and so on. The passages 5, 6, 7 are staggered, being disposed practically diagonally as shown, and they open out into a compartment 8, constituted by a partition 9. In the preferred construction, this compartment is opened at the top and the height of the partition is such that it is slightly below the level of the liquid, as determined by the position of the overflow passage into the next chamber, so that the compartment 8 is mostly filled with liquid fresher, and therefore more efficiently active, than the liquid in the chamber itself, most of which has already been sprinkled on the packing which fills the middle portion of that particular chamber, but nevertheless, should the quantity of incoming liquid, for any reason, such as a slight or permanent difference in the output of the lifting devices for the different chambers, be slightly less than the quantity of liquid being taken out at the corresponding intake, the deficiency is made good by liquid overflowing from the chamber into the compartment.

This arrangement ensures that there will always be a sufficient supply of liquid for sprinkling and that this liquid will consist mostly of the incoming and therefore less used (or even fresh in the case of the first chamber) liquid. For fully obtaining this result, the horizontal cross sectional area of the compartment should not be greater than from 1 to 1½ times the cross sectional area of the pipe to the intake of the pump.

If the lifting device of any chamber has a lesser output than that of the preceding chamber, the liquid in the compartment will of course pass out into the chamber over the partition, as well as out by the pump intake, so that in any case the above object is attained.

As an alternative the compartment may be closed except for an opening at a suitable height and of suitable cross section, permitting liquid from the chamber to overflow into the said compartment.

The gas is admitted at 10, at the top of the last chamber so as to flow through the apparatus generally against the flow of liquid, the freshest gas thereby meeting the most used liquid first and the most spent gas meeting the fresh liquid as it first enters the apparatus. It is immediately mixed with the liquid spray issuing from the sprinkler 11 and the mixed gas and liquid percolate through the interstices of the packing filling the middle portion of the chamber.

In the improved apparatus according to this invention, the packing consists of tubular spaces constituted of corrugated metal sheets 12 of special design, as shown in the figures, adapted to form these spaces by juxtaposition of the cusps of the corrugation, so that each semicircular corrugation in one sheet completes the corresponding corrugation of the adjacent sheet, thereby obtaining circular spaces. In each circular space is inserted a strip 13 of metal twisted about its longitudinal axis and fitting completely the said space.

The advantage of this packing over the use of tubes is that it comprises a considerably smaller number of elements to handle; as a matter of fact, when the tubes are welded together, it consists of one block only, thereby offering great economy in labour and time whenever removal for cleaning or replacement becomes necessary.

As the mixed gas and liquid trickles down the packing, they are set in gyration by the twisted strip and thrown outwardly against the surface of the sheets forming the tubular passages, there resulting thereby a greatly enhanced contacting surface.

On issuing in the lower portion of the chamber, the liquid and the gas separates, the former collecting at the bottom of the chamber, and the latter rising by the uptake 14 to pass on through the aperture 15 into the upper portion of the next chamber to be sprayed by the sprayer 11', trickle down again, rise up by the uptake 14' and pass out at 16 into the next chamber and so on.

What I claim and desire to secure by Letters Patent is:—

1. An apparatus for treating gases with liquids consisting of a succession of chambers each comprising a packing and means for sprinkling on said packing the incoming liquid preferentially to the liquid already in any chamber, said means consisting in a small compartment in a corner of the bottom of each chamber, means for admitting into said compartment the fresher liquid from the preceding chamber, said compartment being separated from the remaining space at the bottom of the chamber by a partition with means for allowing some of the liquid collected at the bottom of that chamber to enter into the said compartment, and lifting devices circulating the liquid in the said chamber the intake to which is near the opening of the inlet for the fresher liquid to the said compartment.

2. An apparatus as claimed in claim 1, in which the compartment is open at the top, the partition being of such height as to be slightly below the level of the liquid as determined by the position of the overflow passage to the next chamber.

3. An apparatus as claimed in claim 1, in which the compartments in successive chambers are situated alternately in the left hand corner and in the right hand corner with respect to the general direction of the liquid through the apparatus.

4. An apparatus as claimed in claim 1, in which the compartment is in a corner diagonally opposite to the outlet passage for the water collected at the bottom of the said chamber.

5. An apparatus as claimed in claim 1 in which the horizontal cross section area of each compartment is from one to one and a half times the cross section area of the intake to the pump.

6. An apparatus for treating gases with liquids having chambers in each of which is disposed a compartment into which the liquid to that chamber is admitted and out of which the liquid is pumped by lifting devices for sprinkling at the top of the chamber, and in which apparatus there are staggered overflow passages for the liquid to pass from one chamber into the next so that the incoming liquid is throughly mixed with the liquid already in the chamber before passing out into the next chamber.

7. An apparatus as claimed in claim 1, in which the packing is constituted by metal sheets with cusped corrugations, juxtaposed so that the semicircular corrugations of one sheet complete the corresponding corrugations of the adjacent sheet to form circular spaces into each of which is placed a metal strip twisted about its longitudinal axis, said strip contacting with the inner surface of said circular space at all points, the axes of the said circular spaces being vertical.

In testimony whereof I affix my signature.

THOMAS OWSTON WILTON.